Feb. 7, 1961 R. C. HOWE 2,970,545
ENERGY CONVERTING DEVICE
Filed Jan. 23, 1956
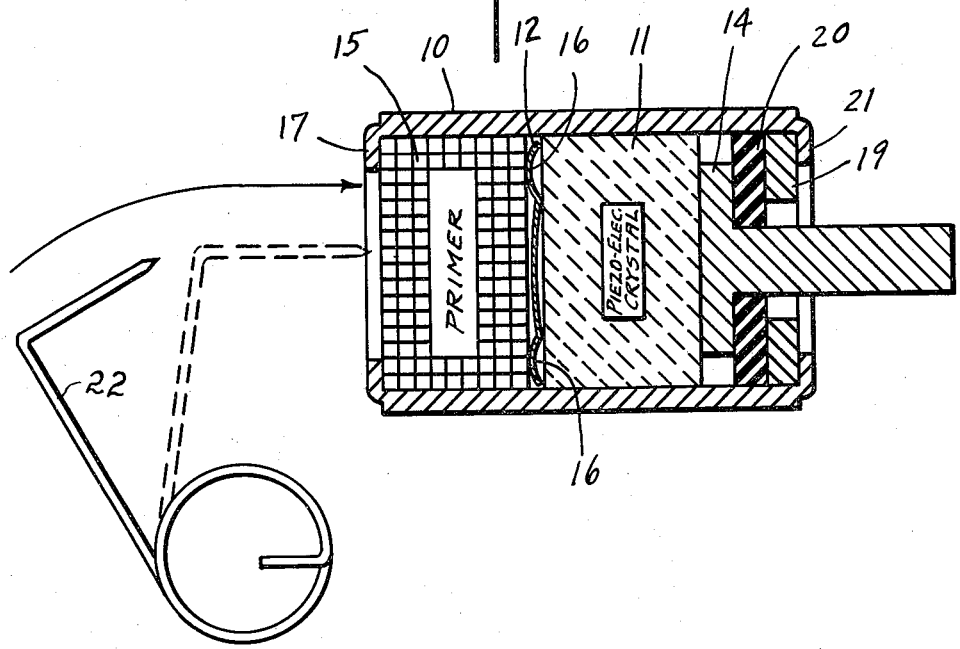
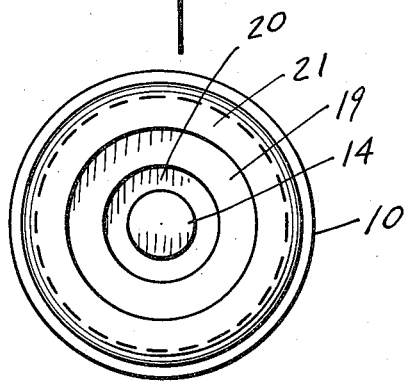
INVENTOR.
RICHARD C. HOWE.
BY
Lockwood, Galt, Woodard & Smith
ATTORNEYS.

United States Patent Office 2,970,545
Patented Feb. 7, 1961

2,970,545

ENERGY CONVERTING DEVICE

Richard C. Howe, Fort Wayne, Ind., assignor to The Magnavox Company, Fort Wayne, Ind., a corporation Filed Jan. 23, 1956, Ser. No. 561,377

2 Claims. (Cl. 102—70.2)

This invention relates generally to energy-converting devices and more particularly to a device for converting mechanical energy into electrical energy.

The principal object of this invention is to provide an energy-converting device which may respond to mechanical energy for converting some of that energy into electrical energy, said device being compact and having rugged structure whereby it can be utilized in devices which are relatively small and which are subject to rough handling.

In accordance with this invention there is provided an energy-converting device consisting of means for generating a quantity of mechanical energy, means for multiplying said mechanical energy, and piezo electrical means responsive to multiplied mechanical energy for generating electrical energy.

The full nature of the invention will be understood from the accompanying drawings and the following description and claims:

Fig. 1 is a longitudinal cross section of an energy-converting device as provided in accordance with this invention.

Fig. 2 is an end view looking from the right-hand end of Fig. 1.

A typical embodiment of this invention may be utilized for the purpose of detonating various types of projectiles or explosives requiring an electro-mechanical fuze.

A cylindrical casing 10 may serve to support and enclose a piezo-electric crystal 11 having a first electrical contact 12 and a second electrical contact 14. At one end of casing 10 an explosive primer 15 of conventional form may be supported in contact with the spring portions 16 of contact 12. Contact 12 may be in the form of a spring member adapted to hold the crystal 11 and the primer 15 in the relative positions illustrated in the drawing. Casing 10 may be provided at its end with a turned over flange 17 against which the primer 15 may rest.

At the other end of casing 10 a supporting plate 19 and an insulator 20 may be interposed between the outer surface of contact 14 and a turned over flange 21. This structure serves to clamp the contact 14 in firm electrical contact with the piezo-electric crystal 11 and it also serves to hold all of the elements 11, 12, 14, and 15 in their proper assembled relation to one another.

In the case of a detonating mechanism a firing pin 22 of conventional form may be supported within a projectile in any desired conventional manner. No projectile structure is shown as it does not form a part of this invention.

In operation, firing pin 22 may be released to stab the explosive primer 15 thereby to cause explosion thereof. The mechanical energy imparted by the firing pin to the primer is multiplied by the explosion and serves to exert pressure on the piezo electric crystal 11. This crystal may be a conventional barium titanate, molded or cast, crystal with the ends coated with silver to provide high conductivity contact surfaces. Crystal 11, as a result of the pressure resulting from the explosion, causes an electrical impulse to flow through any electrical circuit which may be connected to the contacts 12 and 14. While no specific means of connecting contact 12 to an electrical circuit is shown, it will be obvious that several alternative means may be employed. For example, contact 12 may extend into contact with casing 10 and a conductor may be connected thereto and to an electrically actuated device such as a detonator. Alternatively, such a conductor may be connected directly to contact 12 and led through the casing. In a projectile, such an electrical circuit may include an electrical detonating device for initiating explosion of the projectile.

From the foregoing description it will be apparent that this invention provides a very compact device for converting mechanical energy into electrical energy.

Also the device may be relatively simple and light in weight which adapts the device for use in relatively small projectiles. Furthermore, the device has an indefinite electrical life whereby it can remain in storage over a long period of time and still be effective to perform its intended function. The structure is rugged and hence rough handling during shipment and storage cannot cause serious damage.

I claim:

1. A detonator comprising a casing, an explosive primer disposed in one end thereof, a firing pin supported adjacent said primer for initiating firing thereof, pressure responsive pulse generating means comprising a piezo electrical crystal supported within said casing adjacent said primer, an electrical contact terminal between said primer and said crystal consisting of a spring member in pressure contact with said primer and one surface of said crystal, a second electrical contact terminal engaging another surface of said crystal and including an extension protruding from said casing, an insulator between said second contact and said casing, and a retaining plate disposed between the end of said casing and said insulator to clamp said second contact in firm engagement with said crystal.

2. A detonator comprising a casing, an explosive primer disposed in one end thereof, a firing pin supported adjacent said primer for initiating firing thereof, pressure responsive pulse generating means comprising a piezo electric crystal supported within said casing adjacent said primer, an electrical contact terminal between said primer and said crystal consisting of a spring member in pressure contact with said primer and one surface of said crystal, a second electrical contact terminal engaging another surface of said crystal, and a retaining means disposed between the end of said casing and said second contact to clamp it in firm engagement with said crystal.

References Cited in the file of this patent

UNITED STATES PATENTS

| 2,544,077 | Gardner | Mar. 6, 1951 |
| 2,827,851 | Ferrara | Mar. 25, 1958 |

FOREIGN PATENTS

| 277,052 | Switzerland | Nov. 1, 1951 |